United States Patent
Ghezal et al.

(10) Patent No.: US 12,126,380 B2
(45) Date of Patent: Oct. 22, 2024

(54) METHOD FOR TRANSMITTING DATA BY A SPACECRAFT COMPRISING A LASER TRANSMISSION MODULE

(71) Applicant: AIRBUS DEFENCE AND SPACE SAS, Toulouse (FR)

(72) Inventors: Mehdi Ghezal, Toulouse (FR); Emmanuel Giraud, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/689,687

(22) PCT Filed: Sep. 5, 2022

(86) PCT No.: PCT/FR2022/051669
§ 371 (c)(1),
(2) Date: Mar. 6, 2024

(87) PCT Pub. No.: WO2023/037067
PCT Pub. Date: Mar. 16, 2023

(65) Prior Publication Data
US 2024/0275488 A1  Aug. 15, 2024

(30) Foreign Application Priority Data
Sep. 8, 2021 (FR) ....................... 2109387

(51) Int. Cl.
H04B 10/118 (2013.01)
H04B 10/50 (2013.01)
H04B 10/61 (2013.01)

(52) U.S. Cl.
CPC ......... *H04B 10/118* (2013.01); *H04B 10/503* (2013.01); *H04B 10/6165* (2013.01)

(58) Field of Classification Search
CPC . H04B 10/118; H04B 10/503; H04B 10/6165
(Continued)

(56) References Cited

U.S. PATENT DOCUMENTS

| | | | | |
|---|---|---|---|---|
| 10,659,159 B2 * | 5/2020 | Sperandei | ............ | H04B 10/118 |
| 2010/0208244 A1 * | 8/2010 | Earhart | ................ | G01S 17/894 |
| | | | | 356/139.01 |
| 2020/0389232 A1 * | 12/2020 | Danesh | ................ | H04B 10/118 |

FOREIGN PATENT DOCUMENTS

| | | |
|---|---|---|
| CN | 111901032 A | 11/2020 |
| EP | 2247505 A1 | 11/2010 |

(Continued)

OTHER PUBLICATIONS

International Search Report for PCT/FR2022/051669, mailed Jan. 9, 2023, 5 pages.

(Continued)

*Primary Examiner* — Abbas H Alagheband
(74) *Attorney, Agent, or Firm* — Nixon & Vanderhye P.C.

(57) ABSTRACT

A method (50) for image acquisition by a spacecraft (10) comprising an observation instrument (20) and a laser transmission module (30), the method includes: acquiring an image of a calibration area referred to as a calibration image, by the observation instrument (S50), obtaining reference data associated with the calibration area (S51), determining a pointing error of a laser line of sight by comparing the calibration image and the reference data (S52), controlling the pointing of the spacecraft by correcting the pointing error, in order to point the laser line of sight towards a laser reception module (S53), and transmitting data to the laser reception module by the laser transmission module (S54).

15 Claims, 5 Drawing Sheets

(58) Field of Classification Search
USPC .......................................................... 398/121
See application file for complete search history.

(56) References Cited

FOREIGN PATENT DOCUMENTS

| EP | 2388646 A1 | * | 11/2011 | ........... G03B 15/006 |
| EP | 2388646 B1 | | 11/2019 | |
| EP | 3488540 B1 | | 2/2020 | |
| JP | 3556589 B2 | * | 8/2004 | ............ B25J 9/1697 |
| WO | WO-2009101006 A1 | * | 8/2009 | ............. B64G 1/283 |
| WO | 2018/073507 A1 | | 4/2018 | |
| WO | 2018231152 A1 | | 12/2018 | |

OTHER PUBLICATIONS

Written Opinion of the ISA for PCT/FR2022/051669, mailed Jan. 9, 2023, 5 pages.

* cited by examiner

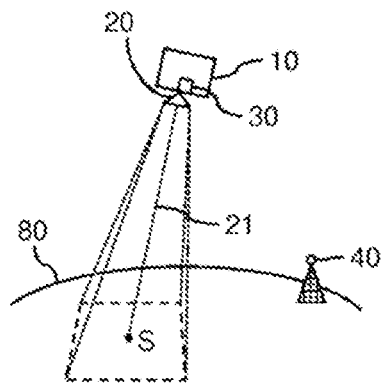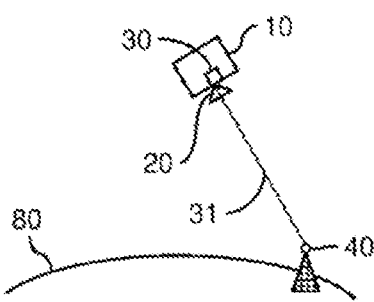
a)     FIG. 1     b)
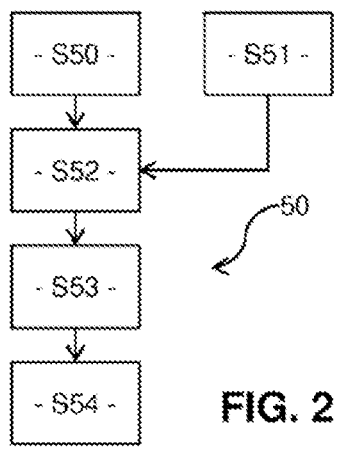
FIG. 2
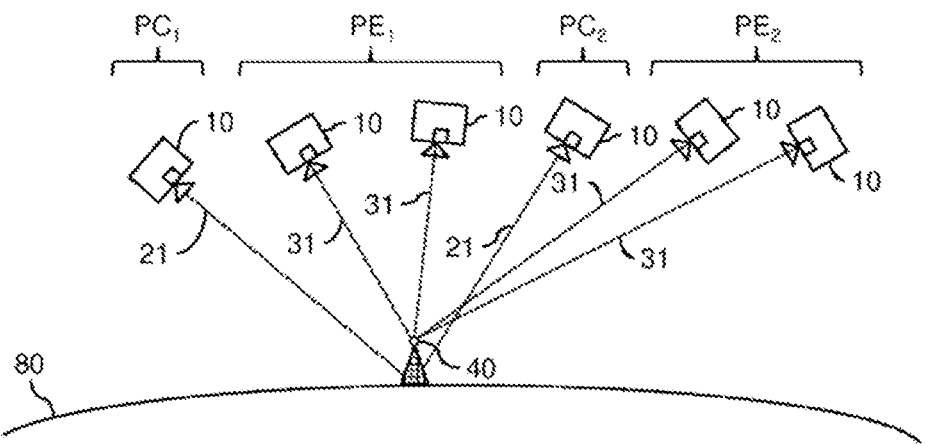
FIG. 3

METHOD FOR TRANSMITTING DATA BY A SPACECRAFT COMPRISING A LASER TRANSMISSION MODULE

RELATED APPLICATIONS

This application is the U.S. national phase of International Application No. PCT/FR2022/051669 filed Sep. 5, 2022 which designated the U.S. and claims priority to FR 2109387 filed Sep. 8, 2021, the entire contents of each of which are hereby incorporated by reference.

FIELD OF DISCLOSURE

This invention belongs to the field of data transmission by spacecraft, such as observation satellites, and more particularly relates to a method for transmitting data by a spacecraft in moving orbit, said data corresponding to images acquired by an observation instrument of the spacecraft, as well to as a spacecraft for implementing such a transmission method.

BACKGROUND

Terrestrial observation missions carried out by a spacecraft consist of acquiring images of portions of the Earth's surface, i.e. capturing pictures of it. Such acquisitions are, for example, carried out in response to customer requests, and serve as a basis for the production of final composite images.

Conventionally, such a spacecraft follows a moving orbit around the Earth in order to acquire images during its flight over the Earth's surface. For this purpose, it comprises an observation instrument associated with a predetermined spatial resolution as well as with an optical line of sight. In a known manner, such an optical line of sight forms the outgoing portion of the optical path of the observation instrument, and points towards the Earth's surface during image acquisitions.

The acquisition method generally implemented for the observation of a terrestrial area is the one known as "pushbroom". In such a "pushbroom" mode, a line sensor successively acquires a plurality of line images and the image of the complete terrestrial area, called the "composite image", is obtained by combining said line images.

Due to the growing demand for image acquisition, it must be possible to acquire numerous images and transfer them to the ground during the same orbital period. To enable the rapid transfer of a large amount of data to the ground, one conceivable possibility is to equip the spacecraft with a laser transmission module for transferring these data via a laser link. However, using a laser transmission module to transfer data to the ground also increases the complexity of the spacecraft as well as its control.

Patent application WO 2018/073507 proposes an observation instrument operating in "pushbroom" mode, comprising a line sensor and a laser transmission module both located in a focal plane of the optics of the observation instrument. Such arrangements are advantageous, since they allow reducing the amount of equipment to be carried on board the spacecraft because the same optics are used by both the line sensor and the laser transmission module.

However, the solution proposed by patent application WO 2018/073507 remains complex, particularly from the point of view of controlling the spacecraft to ensure precise pointing of the laser transmission module during data transfers.

SUMMARY OF THE DISCLOSURE

The present invention aims to remedy some or all of the disadvantages of the prior art, in particular those set forth above, by proposing a solution which makes it possible to improve the pointing of the laser transmission module while reducing the equipment to be carried on board the spacecraft.

For this purpose, and according to a first aspect, a method is proposed for the transmission of data by a spacecraft in moving orbit around the Earth, the spacecraft comprising:
  an observation instrument comprising optics and a sensor array which is located in a focal plane of said optics, in order to acquire images as part of an observation mission of the spacecraft, said observation instrument being associated with a field of view, said field of view being fixed in the spacecraft frame of reference and being defined by the sensor array located in the focal plane of the optics,
  a laser transmission module associated with a laser line of sight that is fixed in the spacecraft frame of reference, said laser transmission module being located in the focal plane or in a secondary focal plane of the optics or in an intermediate focal plane of part of the optics.
The transmission method comprises steps of:
  acquiring an image of what is referred to as a "calibration" area, called a calibration image, by the sensor array,
  obtaining reference data associated with the calibration area,
  determining a pointing error of the laser line of sight by comparing the calibration image and the reference data,
  controlling the pointing of the spacecraft by correcting the pointing error, in order to point the laser line of sight towards a laser reception module,
  transmitting data to the laser reception module by the laser transmission module, said data comprising one or more images acquired by the sensor array as part of the observation mission of the spacecraft.

To be able to precisely control the pointing of the laser line of sight during the transmission of data by the laser transmission module, it is advantageous to take into account a pointing error of the laser line of sight. "Pointing error" is understood to mean a bias in the pointing of the laser line of sight which implies that, if the pointing of the laser line of sight is controlled so as to direct it towards a predetermined setpoint, for example on the Earth's surface, then the laser line of sight actually points to a point that is different from said setpoint. Such a pointing error can be explained, for example, by a lack of knowledge about:
  the actual orientation of the laser sight line in the spacecraft frame of reference: in fact, although the laser sight line is fixed in the spacecraft frame of reference, it can still undergo variations during the spacecraft's mission, in particular due to mechanical (in particular thermoelastic) deformations of a structure of said spacecraft, which can modify the position and orientation of the observation instrument in relation to attitude sensors (star sensor, gyroscope, etc.) of the spacecraft,
  the actual attitude of the spacecraft, for example in the case of errors in the measurements of the attitude sensors (in particular induced by drift of the gyroscopes), in particular in the case considered here where the pointing of the laser line of sight, fixed in the spacecraft frame of reference, is controlled by controlling the attitude of said spacecraft, etc.

The pointing error is essentially a two-dimensional unknown, for example modeled by a roll attitude error (for example around a roll axis collinear with a speed vector of the spacecraft in the inertial frame of reference) and a pitch attitude error (for example around a pitch axis perpendicular to an orbit plane of the spacecraft), etc. To be able to estimate it, we must therefore be able to observe this pointing error in a space of at least two dimensions.

In the proposed solution, the sensor of the observation instrument is a sensor array, meaning a sensor comprising a plurality of rows of acquisition cells and a plurality of columns of acquisition cells. Such a sensor array produces 2D images of the observed scene, which can therefore be used to estimate the pointing error.

In addition, the laser transmission module and the sensor array use (at least in part) the same optics of the observation instrument.

The laser transmission module is for example located in the focal plane of the optics similarly to the sensor array, or in a secondary focal plane obtained by duplication of the focal plane so that the focal plane and the secondary focal plane are optically superimposed. The laser transmission module may also be located in an intermediate focal plane corresponding to part of the optics of the observation instrument. For example, if the observation instrument has Korsch-type optics, the intermediate focal plane can correspond to the focal plane of the associated Cassegrain.

As the laser transmission module and the sensor array use the same optics, the pointing error is essentially the same for the sensor array and the laser transmission module. As a result, the sensor array, used to acquire the images which are then transmitted by the laser transmission module, is advantageously also used to estimate the pointing error of the laser transmission module.

For this purpose, the sensor array acquires a (2D) calibration image of a calibration area for which reference data are available. These reference data associated with the calibration area correspond to data that can be deduced from an image representing the calibration area, and correspond to the expected values for these data in the absence of any pointing error. Therefore, by comparing the reference data to the calibration image (i.e. to the corresponding data values as deduced from the calibration image), it is possible to observe the pointing error and estimate it.

The pointing error thus estimated is then used to correct the pointing of the laser line of sight. The orientation of the laser sight line is then controlled to take into account the estimated pointing error, in order to point the laser line of sight towards the setpoint concerned.

As indicated above, it is the same sensor array which is used both to acquire the images transmitted by the laser transmission module (meaning the images acquired as part of the observation mission of the spacecraft) and to acquire the calibration images used to calibrate the pointing error of the laser line of sight of said laser transmission module. It is therefore not necessary to provide hardware resources dedicated to calibrating the pointing error, such as another sensor array dedicated to the acquisition of calibration images for estimating the pointing error.

In some particular modes of implementation, the transmission method may optionally also comprise one or more of the following features, in isolation or in all technically possible combinations.

In some particular modes of implementation, the reference data comprise a theoretical image of the calibration area.

In some particular modes of implementation, the laser reception module is integrated into a ground station and the calibration area is a terrestrial area associated with said laser reception module.

In some particular modes of implementation, the calibration area is an area of the sky, such that the calibration image represents stars located in the field of view of the sensor array and the reference data are determined based on a star catalog.

In some particular modes of implementation, the laser reception module is carried on board another spacecraft in Earth orbit.

In some particular modes of implementation, the calibration area comprises a light source of predetermined position and the reference data comprise a theoretical position of the light source in the calibration image, the pointing error being determined by comparing an estimated position of the light source in the calibration image to the theoretical position.

In some particular modes of implementation, the light source is co-located with the laser reception module.

In some particular modes of implementation, as the calibration area is an area on the Earth's surface, the spacecraft having a ground speed $V_{sol}$ and the observation instrument being associated with a spatial resolution $R_s$ along a direction of travel, the acquisition of the calibration image is carried out during what is referred to as an "immobilization" period that is greater than $R_s/V_{sol}$, during which the attitude of the spacecraft is controlled so that a ground footprint of the field of view is kept stationary on the Earth's surface. Such arrangements make it possible to avoid motion blur and to improve the signal-to-noise ratio (SNR) of the calibration image. Preferably, the immobilization period is significantly greater than $R_s/V_{sol}$ (by a factor of 100 or even 1000).

In some particular modes of implementation, the steps of the method are iterated for the transmission of data to a same laser reception module, so as to alternate between calibration phases and transmission phases, the calibration phases carrying out the estimation of the pointing error and the transmission phases carrying out the transmission of data to the same reception module.

Indeed, it is possible for the pointing error to vary during a same data transmission, for example due to thermoelastic deformation of the spacecraft's structure, which varies over time. In such case it is advantageous to provide several calibration phases for the pointing error during a data transmission to a same laser reception module, alternating between calibration phases and transmission phases, in order to correct drift in the pointing error.

According to a second aspect, a spacecraft is proposed that is intended to be placed in a moving orbit around the Earth, comprising:

attitude control means for the spacecraft,
an observation instrument associated with a field of view that is fixed in the spacecraft frame of reference and defined by a sensor array located in a focal plane of the optics of the observation instrument,
a laser transmission module associated with a laser line of sight that is fixed in the spacecraft frame of reference, said laser transmission module being located in the focal plane or in a secondary focal plane of the optics or in an intermediate focal plane of part of the optics,
means configured to implement a method for data transmission according to any of the modes of implementation of the invention.

In some particular embodiments, the spacecraft may optionally further comprise one or more of the following features, individually or in all technically possible combinations.

In some particular embodiments:
said spacecraft having a pitch inertia $I_t$ and the attitude control means having a pitch torque formation capacity $C_t$, the ratio $C_t/I_t$ is greater than 0.01 s$^{-2}$, and/or
said spacecraft having a roll inertia Ir and the attitude control means having a roll torque formation capacity Cr, the ratio Cr/Ir is greater than 0.01 s$^{-2}$.

In some particular embodiments, capacity $C_t$ is greater than 0.8 N·m and/or capacity Cr is greater than 0.8 N·m.

In some particular embodiments, the attitude control means comprise at least one reaction wheel which recovers electrical energy and/or at least one control moment gyroscope.

In some particular embodiments, the observation instrument comprises at least two mirrors that are fixed in the spacecraft frame of reference, and the laser transmission module transmits laser radiation along the laser line of sight via at least two mirrors of the observation instrument.

In some particular embodiments, the observation instrument comprises Korsch optics.

BRIEF DESCRIPTION OF THE DRAWINGS

The invention will be better understood by reading the following description, given by way of non-limiting example and made with reference to the figures which show:

FIG. 1: a schematic representation of a spacecraft in a moving orbit around the Earth, FIG. 2: a diagram illustrating the main steps of a mode of implementation of a transmission method, FIG. 3: a schematic representation of the spacecraft during a data transmission comprising several calibration phases and several transmission phases.

In these figures, identical references from one figure to another designate identical or similar elements. For clarity, the elements represented are not to scale unless otherwise noted.

DETAILED DESCRIPTION OF THE EMBODIMENTS

Figure 4:
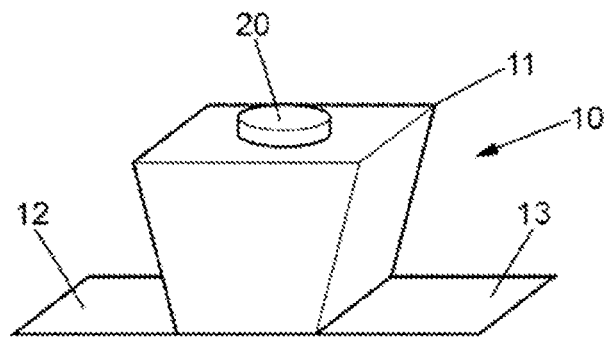
FIG. 4: a schematic representation of a satellite for implementing a transmission method.

FIG. 1 schematically represents a spacecraft in moving orbit (i.e. a non-geostationary orbit) around the Earth 80. Preferably, the spacecraft is placed in a circular orbit, preferably at an altitude lower than 2000 km or even lower than 1000 km. However, in other examples, nothing excludes considering other types of orbits, notably elliptical orbits.

In the example illustrated in FIG. 1, the spacecraft is a satellite 10. However, nothing excludes, in other examples not described, considering other types of spacecraft (space shuttle, probe, etc.).

Satellite 10 moves in its circular orbit around Earth 80 with a ground speed $V_{sol}$. For example, satellite 10 travels in a circular orbit at an altitude substantially equal to 500 km, with a ground speed substantially equal to 7 km·s$^{-1}$.

Satellite 10 comprises an observation instrument 20 for acquiring images of parts of the surface of Earth 80.

"Acquisition" of part of the surface of Earth 80 refers here to the measurement, during a time interval of predetermined duration, of an optical flow received from said part of the surface of Earth 80 by observation instrument 20.

In a manner that is known per se, observation instrument 20 comprises acquisition means configured to capture the optical flow coming from the surface of Earth 80. In particular, observation instrument 20 comprises at least one sensor array 24 comprising a plurality of acquisition cells (pixels) organized in several rows and several columns. In this description, it is assumed that each row extends transversely to the direction of travel, while each column extends substantially along said direction of travel, but this is in no way limiting. Observation instrument 20 also comprises optics comprising one or more mirrors arranged to reflect the optical flow coming from the surface of Earth 80 towards sensor array 24, arranged in a focal plane PF of the optics of observation instrument 20.

Observation instrument 20 is associated with an optical line of sight 21 (part a of FIG. 1). Optical line of sight 21 forms the outgoing part of the optical path of observation instrument 20 and meets the surface of Earth 80 at a point called the "ground point" S. By convention, optical line of sight 21 is defined as corresponding to the optical path originating from the center of sensor array 24. Optical line of sight 21 is fixed in the satellite frame of reference, meaning that the orientation of optical line of sight 21 relative to a body 11 of the satellite cannot be modified and follows the movement of satellite 10 when the attitude of satellite 10 is modified.

Observation instrument 20 is also associated with a field of view that is fixed in the satellite frame of reference. This fixed field of view corresponds to the angular aperture of observation instrument 20 and of the acquisition cells of sensor array 24. Also note that "fixed" refers here to the fact that optical line of sight 21 is fixed in the satellite frame of reference, and in addition that the angular aperture is of invariable size. The field of view of observation instrument 20 forms a ground footprint of length L along the direction of travel. The length of the ground footprint can vary with the incidence of optical line of sight 21 on the surface of Earth 80, and length L corresponds to the minimum length of the ground footprint, which is obtained with nadir pointing of optical line of sight 21. However, image acquisitions are not necessarily carried out with nadir pointing and can be carried out with any pointing.

In addition, observation instrument 20 is associated with a predetermined spatial resolution $R_s$. Conventionally, the spatial resolution corresponds to the size, for example in meters, of the smallest object which can be detected in a scene represented by an image acquired by observation instrument 20. Also, the smaller the size of the smallest detectable object, the greater the spatial resolution. For example, if the spatial resolution is equal to 0.5 meters (m), then the smallest element on the surface of Earth 80 that a sensor pixel can represent has an area of 0.25 m$^2$. Nothing excludes considering other spatial resolution values. Preferably, spatial resolution $R_s$ is less than two meters (2 m), or even less than one meter (1 m). As for length L, the spatial resolution can vary with the incidence of optical line of sight 21 on the surface of Earth 80. Spatial resolution $R_s$ corresponds here to the spatial resolution of observation instrument 20 that is obtained with nadir pointing (and at perigee of the orbit in the case of an elliptical orbit). Spatial resolution $R_s$ is less than length L and is preferably significantly less than length L, for example by a factor of at least 5,000, or even at least 10,000.

Satellite 10 also comprises a laser transmission module 30 for transmitting data in the form of laser radiation. The data to be transmitted in the form of laser radiation comprise in particular images of the surface of Earth 80 which have been acquired by observation instrument 20. These data are transmitted to a laser reception module 40, which is located in a ground station on the surface of Earth 80 in the non-limiting example of FIG. 1. Of course, several laser reception modules 40 may be provided, for example distributed over the surface of Earth 80 in order to increase the opportunities for transferring data to the ground. It is also possible to consider one or more laser reception modules 40 carried onboard other satellites, for example in geostationary orbit (GEO). The link between laser transmission module 30 and a laser reception module 40 is generally referred to as a "laser link".

In a manner that is known per se, laser transmission module 30 comprises a source of laser radiation and a means adapted to modulate the laser radiation according to the data to be transmitted.

Laser transmission module 30 is associated with a laser line of sight 31 (part b of FIG. 1) that is fixed in the satellite frame of reference, similarly to optical line of sight 21. In addition, optical 21 and laser 31 lines of sight are related in that laser transmission module 30 is integrated into observation instrument 20, so that laser transmission module 30 uses all or part of the optics of observation instrument 20. For example, laser transmission module 30 is located in the focal plane PF of observation instrument 20, as is sensor array 24. Other examples are also described below. It should be noted that optical 21 and laser 31 lines of sight may be different from each other, or coincident with each other, depending on the examples.

Due to this integration of laser transmission module 30 into observation instrument 20, the optical 21 and laser 31 lines of sight are essentially subject to the same pointing error. It is therefore possible to estimate the pointing error by means of sensor array 24, and to use the pointing error thus estimated to correct it when controlling the pointing of laser line of sight 31 during data transmissions.

FIG. 2 schematically represents the main steps of a method 50 for transmitting data by satellite 10, by means of laser transmission module 30.

As illustrated in FIG. 2, transmission method 50 comprises a step S50 of acquiring an image of what is referred to as a "calibration" area, called the calibration image, by sensor array 24. The calibration area is a predetermined area, for example an area on the surface of Earth 80 or an area of the sky against a background of stars, for which reference data can be obtained during a step S51. These reference data, of which examples will be described in more detail below, are data that can be deduced from an image representing the calibration area, and correspond to the values expected for these data in the absence of pointing error.

For example, a predetermined setpoint is associated with the calibration area, and the attitude of satellite 10 can be controlled to orient optical line of sight 21 towards this setpoint. Sensor array 24 then acquires the calibration image, which is therefore a representation of the calibration area produced by pointing optical line of sight 21 towards the setpoint. In the presence of a pointing error, which we seek to estimate, the point actually targeted by optical line of sight 21 is different from the setpoint, and the calibration image differs from what it would be in the absence of pointing error.

In preferred modes of implementation, with the calibration area being an area on the surface of Earth 80, the acquisition of the calibration image is carried out during what is referred to as an "immobilization" period that is greater than $R_s/V_{sol}$, during which the attitude of satellite 10 is controlled so that a ground footprint of the field of view is kept stationary on the surface of Earth 80. Such arrangements make it possible to avoid motion blur in the calibration image. Preferably, the immobilization period is significantly greater than $R_s/V_{sol}$ (by a factor of 100 or even 1000), because this contributes to significantly improving the SNR of the calibration image.

As illustrated in FIG. 2, transmission method 50 then comprises a step S52 of determining the pointing error of the laser line of sight by comparing the calibration image and the reference data. It should be noted that this comparison may be direct (for example if the reference data correspond to a reference image of the calibration area concerned) or indirect (for example, preprocessing must be applied beforehand to the calibration image and/or to the reference data). As the reference data are representative of the values expected in the absence of pointing error, the deviation between the reference data and the corresponding data deduced from the calibration image is therefore representative of the pointing error, and this deviation can be used to estimate said pointing error. The pointing error can be estimated in different forms, for example as a roll attitude error and a pitch attitude error, or as a vector connecting the setpoint to the point actually targeted due to the pointing error, etc.

After estimating the pointing error, transmission method 50 comprises a step S53 of controlling the pointing of satellite 10 according to the pointing error, so as to point laser line of sight 31 towards a laser reception module 40. In other words, the orientation of laser line of sight 31 is controlled in order to compensate for the estimated pointing error. In one non-limiting example, if satellite 10 is to be placed, in the absence of pointing error, in an attitude setpoint $(A_{r0}, A_{t0})$ ($A_{r0}$ being the roll and $A_{t0}$ the pitch attitude setpoint) for orienting laser sight line 31 towards laser reception module 40, and if the estimated pointing error corresponds to a roll attitude error $\delta A_r$ and a pitch attitude error $\delta A_t$, then it is possible to consider a modified attitude setpoint $(A_{r0}-\delta A_r, A_{t0}-\delta A_t)$ for orienting laser line of sight 31 while compensating for the pointing error.

As laser line of sight 31 is oriented towards laser reception module 40, transmission method 50 then comprises a step S54 of transmitting data to said laser reception module 40 by laser transmission module 30, via the laser link. As indicated above, the data may in particular comprise one or more images acquired by sensor array 24 as part of the observation mission of satellite 10.

It should be noted that for the entire duration of data transmission step S54, the attitude of satellite 10 is controlled in order to keep laser line of sight 31 oriented towards laser reception module 40. If we consider for example a laser reception module 40 integrated into a ground station that is stationary on the surface of Earth 80, this therefore means that the pointing of laser line of sight 31 must be kept stationary on the surface of Earth 80 for the entire duration of data transmission step S54. "Kept stationary" is understood to mean that the satellite attitude setpoint is determined so as to keep the point targeted by laser line of sight 31 substantially stationary on laser reception module 40, which itself is stationary on the surface of Earth 80, despite the advancing movement of satellite 10. "Substantially stationary" is understood to mean that the goal of the attitude control is to keep the point targeted by laser line of sight 31 stationary, but that it can vary slightly during the time interval of transmission step S54, due for example to attitude control errors and/or measurement noise. Due to such attitude control, it is understood that the incidence of laser line of sight 31 on the surface of Earth 80 varies during the time interval of transmission step S54. For example, if the incidence of laser line of sight 31 is substantially normal to the surface of Earth 80 at the start of transmission step S54, then the incidence of laser line of sight 31 on said surface of Earth 80 will be slightly oblique at the end of transmission step S54, to compensate for the advancing movement of satellite 10. Thus, the given attitude setpoint varies during transmission step S54 and aims in particular to stop the advancing movement of laser line of sight 31 over the ground.

It should be noted that, since the pointing error is likely to drift over time, it is preferable to reduce the duration between the estimation of the pointing error and the data transmission. In some preferred modes of implementation, the calibration area is located near laser reception module 40, in order to limit the duration of the maneuver necessary to change from pointing optical line of sight 21 towards the setpoint associated with the calibration area to pointing laser line of sight 31 towards laser reception module 40. In certain modes of implementation, the setpoint associated with the calibration area and laser reception module 40 can be coincident, in particular if optical line of sight 21 and laser line of sight 31 are coincident.

As a result, if laser reception module 40 is integrated into a ground station on the surface of Earth 80, then the calibration area is preferably a terrestrial area associated with said ground station, meaning a predetermined terrestrial area containing said ground station or in proximity to it. If laser reception module 40 is on board another spacecraft, for example another satellite in GEO orbit, the calibration area is preferably an area of the sky associated with said other satellite, meaning an area of the sky behind the other satellite relative to observation instrument 20 or offset relative to said other satellite.

Additionally or alternatively, in some preferred embodiments, satellite 10 has high torque formation capacities, in particular relative to the inertia of said satellite 10, in order to be able to carry out any maneuvers very quickly, and thus limit the duration between the estimation of the pointing error and the data transmission.

In certain cases, the drift of the pointing error may be non-negligible during the time required to transmit all of the data to be transmitted, for example if the pointing error drifts quickly and/or if the amount of data to be transmitted is significant. In this case, it may be necessary to monitor the pointing error.

Thus, in preferred modes of implementation, the steps of transmission method 50 are iterated for the transmission of data to a same laser reception module 40, in order to monitor the pointing error on the basis of a plurality of calibration images successively acquired during the same data transmission. In this case, the data transmission to a same laser reception module 40 can be broken down into an alternation between calibration phases and transmission phases:

- a calibration phase groups together the steps of transmission method 50 which relate to estimating the pointing error, namely step S50 of acquiring a calibration image (including pointing control in order to direct the optical line of sight towards the calibration area concerned), step S51 of obtaining reference data, and step S52 of estimating the pointing error,
- a transmission phase groups together the steps of transmission method 50 which relate to data transmission, namely step S53 of pointing control on the basis of the pointing error, and step S54 of data transmission.

The data are transmitted to a same laser reception module 40, so that pointing control step S53 in each transmission phase aims to direct laser line of sight 31 towards laser reception module 40. For this data transmission to a same laser reception module 40, the calibration phases may all acquire calibration images of the same calibration area, or may acquire calibration images of different calibration areas.

FIG. 3 schematically represents satellite 10 in the process of transmitting data to a laser reception module 40 on the surface of Earth 80. As illustrated by FIG. 3, the data transmission is broken down into two transmission phases $PE_1$ and $PE_2$ which are preceded by respective calibration phases $PC_1$ and $PC_2$.

Transmission method 50 firstly comprises a first calibration phase $PC_1$ aimed at making a first estimate of the pointing error. During first calibration phase $PC_1$, sensor array 24 acquires a first calibration image of a first calibration area, obtains the first associated reference data, and from this deduces the first estimate of the pointing error.

Transmission method 50 then comprises a first transmission phase $PE_1$ aimed at transmitting data to laser reception module 40. During first transmission phase $PE_1$, laser line of sight 31 is directed towards laser reception module 40 while taking into account the first estimate of the pointing error, and data is transmitted by laser transmission module 30 while keeping laser line of sight 31 stationary on laser reception module 40.

Transmission method 50 next comprises a second calibration phase $PC_2$ aimed at making a second estimate of the pointing error. During second calibration phase $PC_2$, sensor array 24 acquires a second calibration image of a second calibration area (which may be the same as the first calibration area), obtains the second associated reference data (if necessary), and from this deduces the second estimate of the pointing error.

Transmission method 50 next comprises a second transmission phase $PE_2$ aimed at continuing the data transmission to laser reception module 40. During second transmission phase $PE_2$, laser line of sight 31 is directed towards laser reception module 40 while taking into account the second estimate of the pointing error, and data are transmitted by laser transmission module 30 while keeping laser line of sight 31 stationary on laser reception module 40.

We now describe some non-limiting examples of calibration areas and the associated reference data, which can be used to estimate the pointing error for laser transmission module 30.

According to a first example, the reference data associated with a calibration area correspond to a theoretical image of said calibration area. This theoretical image represents the image of the calibration area which should have been obtained by satellite 10 in the absence of any pointing error, during the acquisition of the calibration image.

Indeed, based on a georeferenced image of the calibration area (previously acquired, for example by sensor array 24 of satellite 10 during a previous pass over the calibration area), it is possible to position the theoretical footprint of the field of view of sensor array 24 over this georeferenced image during the acquisition of the calibration image (taking into account the position of satellite 10 in its orbit and the target setpoint during this acquisition, and possibly a digital terrain model of the calibration area). The intersection between the theoretical footprint and the georeferenced image therefore corresponds to a theoretical image of the calibration area. In the absence of any pointing error, the calibration image should be substantially identical to this theoretical image. Registration of the calibration image with the theoretical image, which can make use of any method known to those skilled in the art, allows establishing a correspondence between the pixels of these images, meaning it allows identifying the pixels of these images which represent the same portion of the calibration area. Comparison of the positions, in the images, of pixels representing a same portion of the calibration area can be used to estimate the pointing error affecting the acquisition of the calibration image.

According to another example, the reference data include a theoretical position in the calibration image of a characteristic element of the calibration area. "Characteristic element" is understood to mean an element which can be detected in the calibration image, for example because it must have a characteristic shape in the calibration image, or, preferably, because it manifests in the calibration image as one or more pixels having characteristic values. For example, based on the geographical coordinates of the characteristic element in the calibration area, it is possible to estimate the theoretical position in the calibration image of this characteristic element (taking into account the position of satellite 10 in its orbit and the target setpoint during this acquisition, and possibly a digital terrain model of the calibration area). The actual position of the characteristic element in the calibration image can be estimated by detecting said characteristic element in the calibration image. The comparison of the theoretical position and the actual position of the characteristic element in the calibration image can then be used to estimate the pointing error in the acquisition of the calibration image.

In preferred modes of implementation, the characteristic element is a light source, which emits light radiation which results in characteristic values for the pixel(s) representing said light source in the calibration image.

If the calibration area is passed over by the satellite during the night, for example when the Earth is between satellite 10 and the sun, then the light radiation emitted by the light source is for example radiation in the visible wavelength range. Indeed, as the calibration area is not being illuminated by the sun, high-intensity light radiation, even in the visible wavelength range, could be detected in the calibration image, especially since its theoretical position in said calibration image is known.

If the calibration area is passed over by the satellite during the day, meaning that said calibration area is illuminated by the sun, then the light radiation emitted by the light source is preferably radiation in the range of non-visible wavelengths, for example infrared radiation such as near-infrared (NIR). Indeed, given that the calibration area is illuminated by the sun, it will be easier to detect radiation in the non-visible wavelength range, such as NIR radiation. This obviously assumes that sensor array 24 is also sensitive to the non-visible wavelength range used by the light source.

Preferably, the light radiation emitted by the light source is laser radiation. Such laser radiation can be detected more precisely in the calibration image, which makes it possible to improve the precision of the pointing error estimation. For example, the light source is a laser transmission module, which can be co-located with laser reception module 40, used to transmit data to satellite 10 (which, where appropriate, comprises a laser reception module).

According to another example, the calibration area is an area of the sky, so the calibration image represents stars located in the field of view of sensor array 24, and the reference data are determined from a star catalog. In a manner that is known per se, a star catalog contains information which allows knowing the positions of certain stars, for example the ephemeris of these stars. Sensor array 24 of observation instrument 20 is therefore used as a star sensor. For example, it is possible to estimate the attitude of satellite 10 from the positions of the stars in the calibration image. The pointing error can then be estimated, for example, by comparing the estimated attitude with the attitude measured by other attitude sensors of satellite 10. It is also possible to determine the theoretical positions of the stars in the calibration image, based on the star catalog. The pointing error can then be estimated, for example, by comparing the actual positions of said stars in the calibration image with their theoretical positions.

FIG. 4 schematically represents an example implementation of a satellite 10 for implementing transmission method 50.

As illustrated by FIG. 4, satellite 10 comprises two solar generators 12, 13 arranged on respective opposite faces of a body 11 of satellite 10. Observation instrument 20 is arranged on a face which connects said faces carrying solar generators 12, 13.

Satellite 10 also comprises attitude control means (not shown in the figures), such as inertial actuators. Said attitude control means have a pitch torque formation capacity $C_t$ and a roll torque formation capacity Cr. In other words, $C_t$ (respectively Cr) corresponds to the maximum value that a pitch (respectively roll) torque formed by the attitude control means of satellite 10 can take.

In addition, the pitch inertia of satellite 10 is designated $I_t$ and the roll inertia of satellite 10 is designated Ir.

Satellite 10 further comprises a processing circuit (not shown in the figures) which controls the operation of observation instrument 20, laser transmission module 30, and the attitude control means. The processing circuit comprises for example one or more processors, and storage means (magnetic hard disk, electronic memory, optical disk, etc.) in which a computer program product is stored in the form of a set of program code instructions to be executed in order to implement the various steps of transmission method 50. Additionally or alternatively, the processing circuit comprises one or more programmable logic circuits (FPGA, PLD, etc.), and/or one or more dedicated integrated circuits (ASIC, etc.), and/or a set of discrete electronic components, etc., adapted for carrying out some or all of said steps of acquisition method 50.

In other words, the processing circuit corresponds to means configured in software (specific computer program product) and/or hardware (FPGA, PLD, ASIC, discrete electronic components, etc.) to perform some or all of the steps of transmission method 50, via an appropriate control of observation instrument 20, laser transmission module 30, and the attitude control means.

It should be noted that satellite 10 may conventionally also comprise other elements such as sensors (star sensor, gyroscope, etc.), which may also be connected to the processing circuit.

In some preferred embodiments, the ratio $C_t/I_t$ is greater than $0.01\ s^{-2}$, or even greater than $0.018\ s^{-2}$. For example, pitch torque formation capacity $C_t$ is greater than 0.8 Newton-meter (N·m) and pitch inertia $I_t$ is less than 80 kg·m². In some preferred embodiments, pitch torque formation capacity $C_t$ is greater than 1 N·m and pitch inertia $I_t$ is less than 60 kg·m².

By considering a satellite 10 having a high $C_t/I_t$ ratio, it is possible to carry out rapid maneuvers. In particular, if the transition from an orientation of optical line of sight 21 towards a calibration area (calibration phase) to an orientation of laser line of sight 31 towards laser reception module 40 (transmission phase) requires a pitch maneuver, a high $C_t/I_t$ ratio makes it possible to limit the duration of this maneuver, which in particular makes it possible to reduce any drift in the pointing error between the moment it is estimated (calibration phase) and the moment it is used (transmission phase). It should be noted that all that has been stated above for pitch capacity $C_t$ and ratio $C_t/I_t$ is in particular also applicable for roll capacity Cr and ratio Cr/Ir.

In some preferred embodiments, the attitude control means comprise one or more reaction wheels which recover electrical energy. Such reaction wheels which recover electrical energy are known in particular from patent application EP 2247505 A1.

The use of reaction wheels which recover electrical energy is particularly advantageous for the following reasons. First of all, it should be noted that in order to provide a high pitch (respectively roll) torque capacity (greater than 0.8 N·m or even greater than 1 N·m) by means of reaction wheels, it is necessary to use fairly massive reaction wheels, which tends to increase the pitch inertia $I_t$ (respectively Ir) of satellite 10. However, with reaction wheels which recover electrical energy, in particular as described in patent application EP 2247505 A1, it is possible to reduce the mass required at equivalent torque capacity compared to reaction wheels which do not recover electrical energy. In addition, because the reaction wheels recover electrical energy, the electrical energy requirements of satellite 10 are reduced. In particular, it is possible to reduce the dimensions and mass of solar generators 12, 13, which makes it possible to reduce the inertia of satellite 10. Thus, the increase in mass that may be required in order to have significant torque capacity (although less with reaction wheels which recover electrical energy than with reaction wheels which do not recover electrical energy) can be offset at least in part by a reduction in the mass and dimensions of solar generators 12, 13.

In some particular embodiments, the attitude control means comprise one or more control moment gyroscopes (CMG).

The use of control moment gyroscopes is particularly advantageous because they have a high ratio of torque capacity to mass. It is thus possible to have a high torque capacity without adversely affecting the inertia of satellite 10.

As indicated above, observation instrument 20 comprises at least one sensor array 24, for example of the CMOS type (acronym for "Complementary Metal-Oxide Semiconductor"). However, it should be noted that observation instrument 20 may comprise several sensor arrays 24. For example, several sensor arrays may be used to acquire images in different respective wavelengths (red, green, blue, near-infrared, etc.), etc.

In some preferred embodiments, observation instrument 20 comprises a Bayer filter. A Bayer filter, in a manner that is known per se, allows acquiring red, green, and blue (RGB) color images in different respective wavelengths with a same sensor array 24. Such arrangements allow simplifying observation instrument 20.

Figure 5:
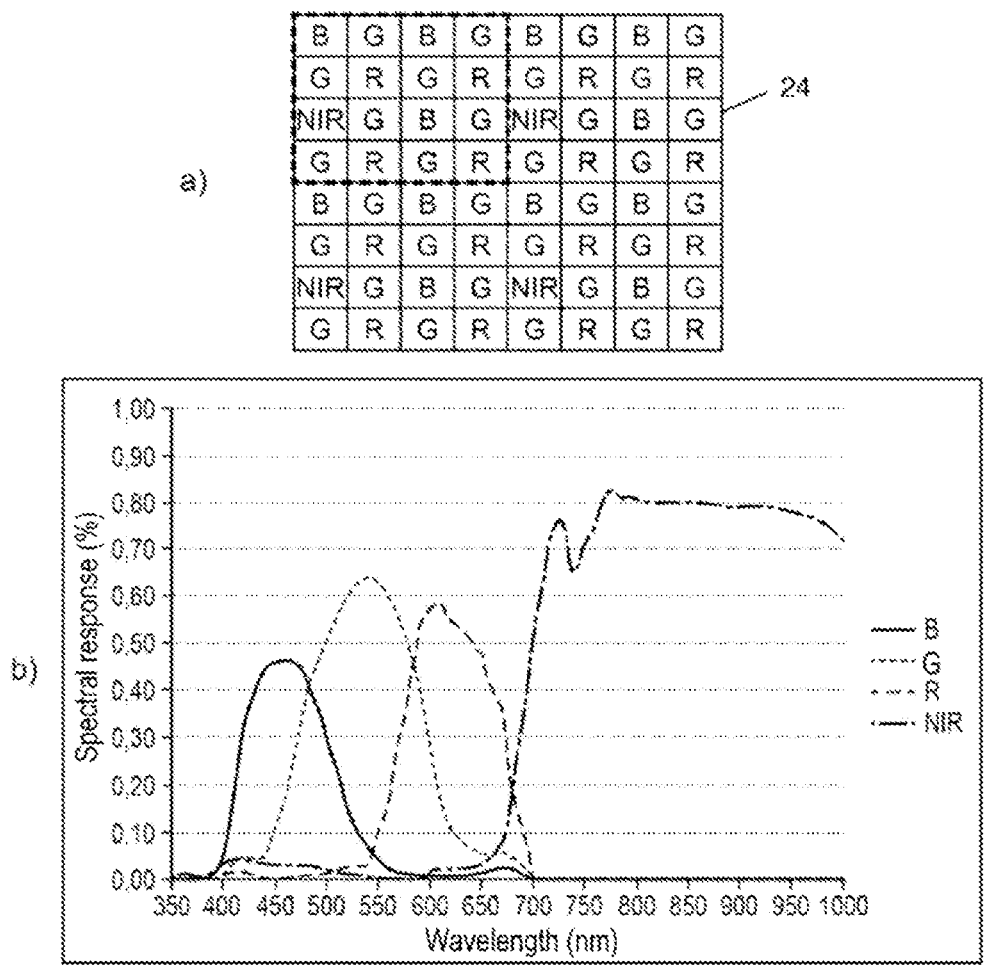
FIG. 5: a schematic representation of a sensor array implementing a modified Bayer filter.

In certain embodiments, it is possible to modify the Bayer filter to include near-infrared. An example of such a modified filter is presented schematically in FIG. 5. More particularly, part a) of FIG. 5 represents a sensor array 24 comprising several sets of acquisition cells, respectively sensitive in the red (designated R in FIG. 5), green (G), blue (B), and near-infrared (NIR) wavelengths. In this example, sensor array 24 comprises 16×16 acquisition cells, and can be extended to a larger number of acquisition cells by repeating for example the pattern of 4×4 acquisition cells located in the upper left (surrounded by a dotted line). Part b) of FIG. 5 shows the spectral responses of the different filters respectively associated with the red (R), green (G), blue (B), and near-infrared (NIR) wavelengths. It is also possible, according to other examples, to have several focal planes, including a focal plane with a sensor array and a conventional Bayer filter (forming a Bayer array) and a focal plane with at least one other sensor array and another filter, for example near-infrared. Finally, there is no reason the focal plane cannot be split according to the respective filters adapted to a particular mission, or using a single focal plane with no filter.

In some preferred embodiments, observation instrument 20 is configured to successively activate acquisition cells during the acquisition of an image. Such an acquisition mode is known as "rolling shutter acquisition mode". Such arrangements, particularly suitable for very large sensor arrays, allow reducing the amount of data that must be simultaneously processed by observation instrument 20, since the acquisition cells are not all activated simultaneously.

In addition to one or more sensor arrays 24, observation instrument 20 may comprise other elements, for example such as optics comprising one or more mirrors, one or more lenses, a support structure, electronic components, etc.

In preferred embodiments, observation instrument 20 comprises at least two mirrors that are fixed in the spacecraft frame of reference, and laser transmission module 30 transmits laser radiation along laser line of sight 31 via at least two mirrors of observation instrument 20. Thus, while the mirrors are utilized to successively reflect an optical flow received from the surface of Earth 80 towards sensor array 24, some or all of these mirrors are also used to reflect, in the opposite direction, the laser radiation transmitted by laser transmission module 30. Observation instrument 20 and laser transmission module 30 are therefore structurally linked to each other, and are therefore subject to the same pointing errors. They can be viewed as corresponding to the same piece of equipment for pointing control operations.

Figure 6:
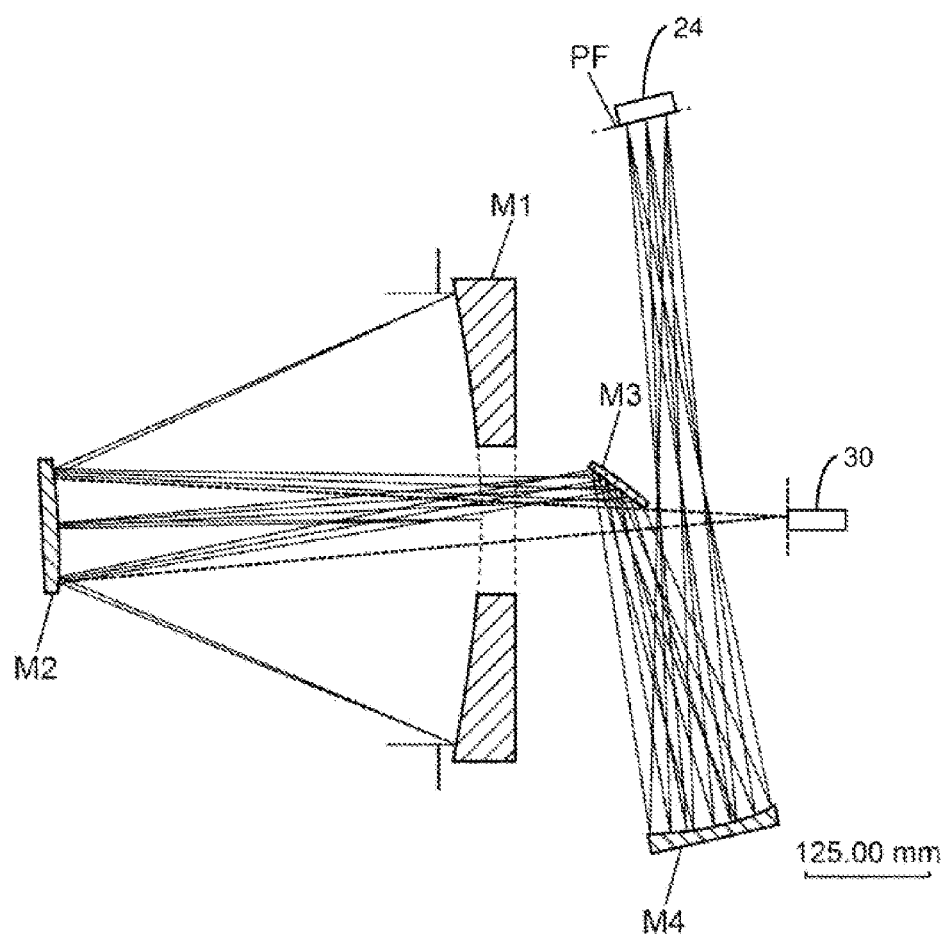
FIG. 6: a representation of a section view of a first exemplary embodiment of an observation instrument and a laser transmission module.
Figure 7:
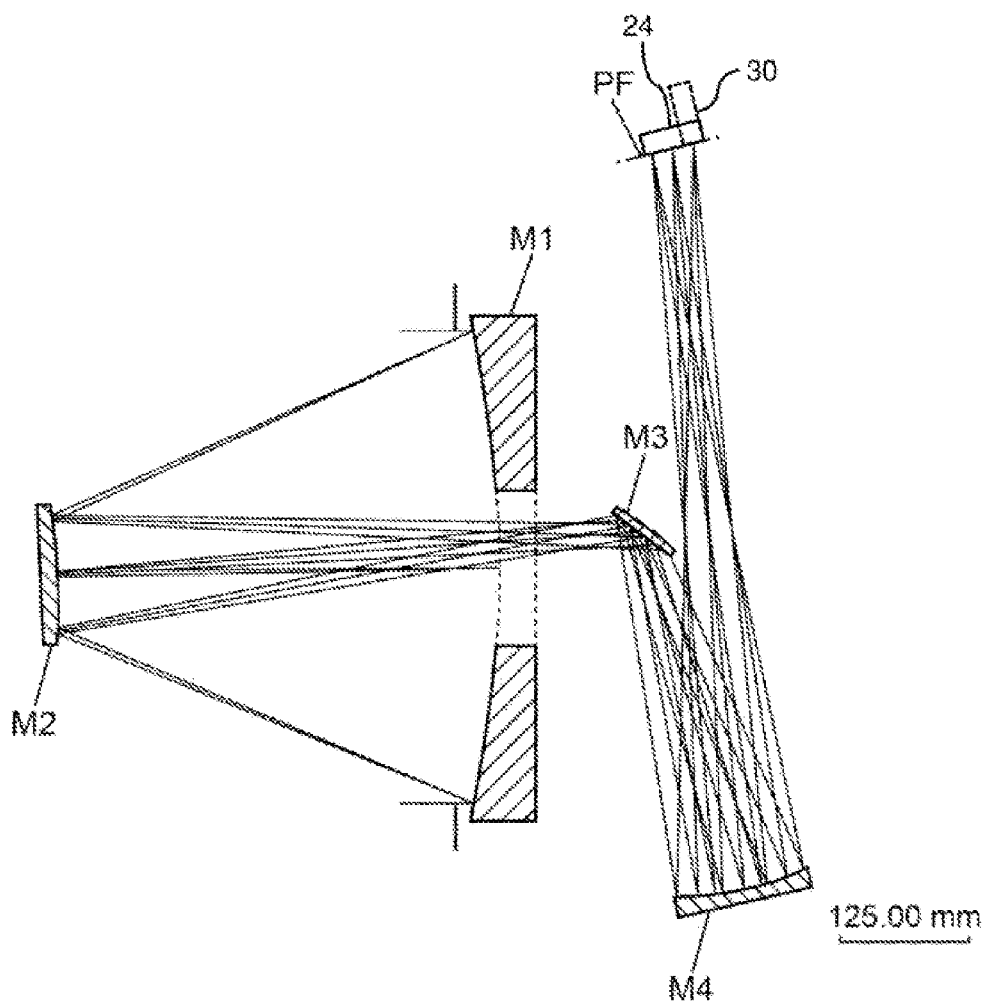
FIG. 7: a representation of a section view of a second exemplary embodiment of the observation instrument and laser transmission module.
Figure 8:
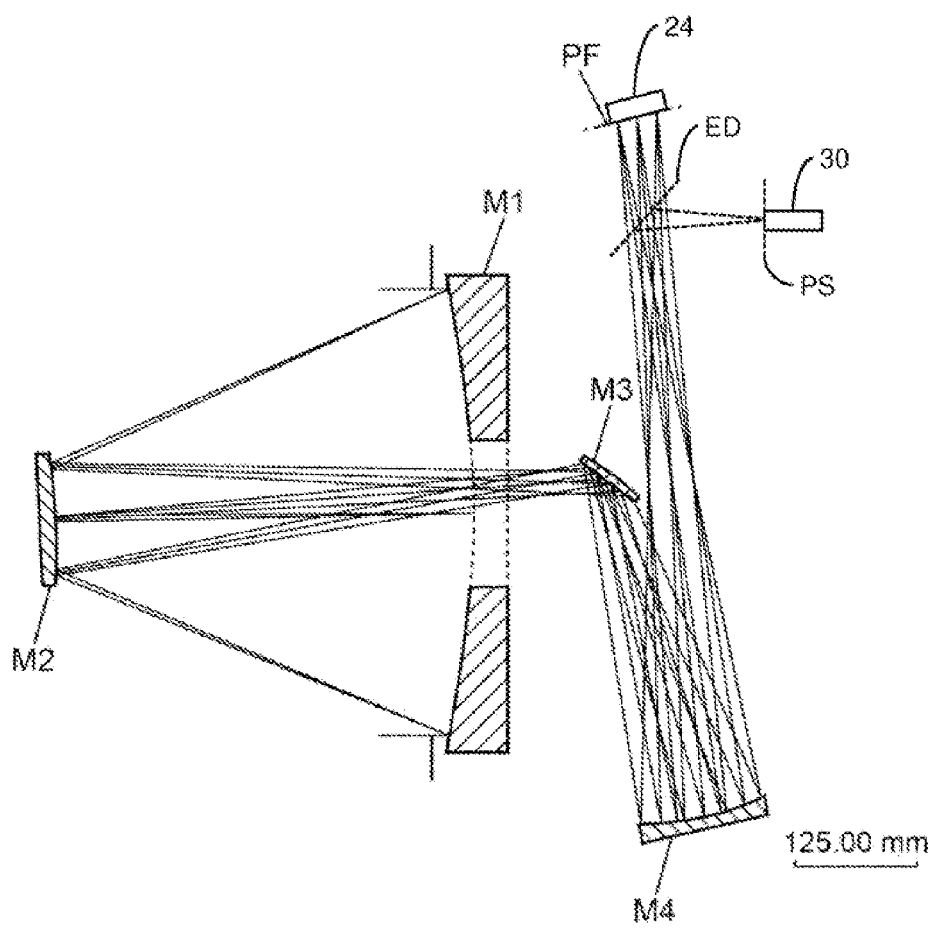
FIG. 8: a representation of a section view of a third exemplary embodiment of the observation instrument and laser transmission module.

FIGS. 6 to 8 show non-limiting examples of embodiments in which mirrors of observation instrument 20 are used by laser transmission module 30. It should be noted that FIGS. 6 to 8 are represented to scale, but only for the various mirrors and their respective positions.

In FIGS. 6 to 8, the optics of observation instrument 20 are of the Korsch type, which allows for great compactness as well as low mass, with a high focal length. As illustrated in FIGS. 6 to 8, the Korsch optics comprise a 480 mm mirror M1, a 160 mm mirror M2, a folding mirror M3, and a mirror M4. The incident optical flow is therefore successively reflected by mirror M1, mirror M2 (through mirror M1), folding mirror M3, and mirror M4, until reaching focal plane PF where sensor array 24 of observation instrument 20 is located.

With such Korsch optics, it is possible to design an observation instrument weighing around 80 kg, carried in a satellite weighing around 300 kg. The focal plane may comprise for example one or more sensor arrays, each sensor array comprising 14192×10140 acquisition cells (pixels), for example according to the IMX 411 model marketed by Sony®. For a satellite orbiting at an altitude of 500 km, this allows achieving a resolution of 0.5 m, with a length L of 5 km. For example, body 11 of the satellite has dimensions of 1.53×1.14×1.0 m. Two solar generators 12, 13 of 1 m² provide power of 250 W which is sufficient for the needs of the satellite. Due to this compactness, the inertias $I_{xx}$, $I_{yy}$, $I_{zz}$ along the three axes X, Y, Z of the satellite frame of reference are low: $(I_{xx}, I_{yy}, I_{zz})=(57, 76, 77)$ kg·m². In orbit, the attitude of satellite 10 is for example controlled around a reference attitude in which the X axis is collinear with the roll axis and the Y axis is collinear with the pitch axis, in which case the inertias $I_{xx}$ and $I_{yy}$ respectively correspond to the roll inertia $I_r$ and to the pitch inertia $I_t$.

In the example illustrated in FIG. 6, laser transmission module 30 is facing towards mirror M2, in an intermediate focal plane associated with mirrors M1 and M2. The laser radiation emitted by laser transmission module 30 is therefore successively reflected by mirror M2 then by mirror M1, from which it is reflected along laser line of sight 31.

In the example illustrated by FIG. 7, laser transmission module 30 is located in focal plane PF of observation instrument 20, at a location in focal plane PF which is offset relative to sensor array 24. The laser radiation emitted by laser transmission module 30 is therefore successively reflected by mirrors M4, M3, M2, and M1 from which it is reflected along laser line of sight 31. In this example, optical 21 and laser 31 lines of sight by necessity are different from each other, and laser line of sight 31 is not in the field of view of sensor array 24. If we consider for example the case where the calibration image aims to detect a light source which corresponds to a laser transmission module on the ground which is co-located with laser reception module 40, then it is necessary to carry out a maneuver between the acquisition of the calibration image (the laser transmission module on the ground and laser reception module 40 being located in the field of view of sensor array 24) and the transmission of data (laser line of sight 31, outside the field of view of sensor array 24, being oriented towards laser reception module 40). In such case, a ratio $C_t/I_t$ (respectively $C_r/I_r$) that is greater than 0.01 s⁻², or even greater than 0.018 s⁻², makes it possible to reduce the duration of this maneuver.

In the example illustrated by FIG. 8, laser transmission module 30 is located in a secondary focal plane PS, which corresponds to a duplication of focal plane PF of observation instrument 20. For this purpose, a focal plane duplication element ED is arranged in the path of the radiation between focal plane PF and mirror M4. Duplication element ED may comprise a mirror or a dichroic reflector configured to reflect one among the laser radiation from laser transmission module 30 and the optical flow originating from the observed scene, and to transmit without reflection the other among the laser radiation and optical flow. In the example illustrated by FIG. 8, it is the laser radiation which is reflected, so the laser radiation is successively reflected by the duplication element ED and then mirrors M4, M3, M2, and M1. In this example, optical 21 and laser 31 lines of sight may be coincident. If we consider for example the case where the calibration image aims to detect a light source which corresponds to a laser transmission module on the ground which is co-located with laser reception module 40, then the fact of having coincident optical 21 and laser 31 lines of sight makes it possible to greatly reduce requirements in terms of the maneuvering between the acquisition of the calibration image and the transmission of data to laser reception module 40.

It should be noted that other configurations are possible for the optics of observation instrument 20, which in particular may comprise a different number of mirrors than the number of mirrors (4) represented in FIGS. 6 to 8. For example, the optics of the observation instrument may comprise two mirrors, for example arranged similarly to mirrors M1 and M2 of FIG. 6, the laser transmission module 30 and sensor array 24 both being for example located in the focal plane of observation instrument 20 (which in this case corresponds to the intermediate focal plane of FIG. 6).

The invention claimed is:

1. A method for a transmission of data by a spacecraft in moving orbit around the Earth, the spacecraft comprising:
   an observation instrument comprising optics and a sensor array which is located in a focal plane of said optics, in order to acquire images as part of an observation mission of the spacecraft, said observation instrument being associated with a field of view that is fixed in a spacecraft frame of reference and is defined by the sensor array,
   a laser transmission module associated with a laser line of sight that is fixed in the spacecraft frame of reference, said laser transmission module being located in the focal plane or in a secondary focal plane of the optics or in an intermediate focal plane of part of the optics,
   said method comprising:
   acquiring an image of a calibration area, referred to as a calibration image, by the sensor array,
   obtaining reference data associated with the calibration area,
   determining a pointing error of the laser line of sight by comparing the calibration image and the reference data,
   controlling pointing of the spacecraft by correcting the pointing error, in order to point the laser line of sight towards a laser reception module, and
   transmitting data to the laser reception module by the laser transmission module, said data comprising one or more images acquired by the sensor array as part of the observation mission of the spacecraft.

2. The method according to claim 1, wherein the reference data comprise a theoretical image of the calibration area.

3. The method according to claim 2, wherein the laser reception module is integrated into a ground station and the calibration area is a terrestrial area.

4. The method according to claim 1, wherein the calibration area is an area of the sky, such that the calibration image represents stars located in the field of view of the sensor array and the reference data are determined based on a star catalog.

5. The method according to claim 4, wherein the laser reception module is carried on board another spacecraft in Earth orbit.

6. The method according to claim 1, wherein the calibration area comprises a light source of predetermined position and the reference data comprise a theoretical position of the light source in the calibration image, the pointing error being determined by comparing an estimated position of the light source in the calibration image to the theoretical position.

7. The method according to claim 6, wherein the light source is co-located with the laser reception module.

8. The method according to claim 1, wherein, the spacecraft having a ground speed Vsol and the observation instrument being associated with a spatial resolution Rs along a direction of travel, the acquisition of the calibration image is carried out during an immobilization period that is greater than Rs/Vsol, during which the attitude of the spacecraft is controlled so that a ground footprint of the field of view is kept stationary on the Earth's surface.

9. The method according to claim 1, wherein the steps of the method are iterated for the transmission of data to a same laser reception module, so as to alternate between calibration phases and transmission phases, the calibration phases carrying out the estimation of the pointing error and the transmission phases carrying out the transmission of data to the same laser reception module.

10. A spacecraft configured to be placed in a moving orbit around the Earth along a direction of travel, the spacecraft comprising:
attitude control means for the spacecraft,
an observation instrument associated with a field of view that is fixed in the spacecraft frame of reference and defined by a sensor array located in a focal plane of the optics of the observation instrument,
a laser transmission module associated with a laser line of sight that is fixed in the spacecraft frame of reference, said laser transmission module being located in the focal plane or in a secondary focal plane of the optics or in an intermediate focal plane of part of the optics,
means configured to implement a method for data transmission according to the method of claim 1.

11. The spacecraft according to claim 10, wherein:
said spacecraft having a pitch inertia It and the attitude control means having a pitch torque formation capacity Ct, the ratio Ct/It is greater than 0.01 s$^2$, and/or
said spacecraft having a roll inertia Ir and the attitude control means having a roll torque formation capacity Cr, the ratio Cr/Ir is greater than 0.01 s$^2$.

12. The spacecraft according to claim 11, wherein the pitch torque formation capacity Ct is greater than 0.8 N·m and/or the roll torque formation capacity Cr is greater than 0.8 N·m.

13. The spacecraft according to claim 10, wherein the attitude control means comprise at least one reaction wheel which recovers electrical energy and/or at least one control moment gyroscope.

14. The spacecraft according to claim 1, wherein the observation instrument comprises at least two mirrors that are fixed in the spacecraft frame of reference, and the laser transmission module transmits laser radiation along the laser line of sight via at least two mirrors of the observation instrument.

15. The spacecraft according to claim 14, wherein the observation instrument comprises Korsch optics.

\* \* \* \* \*